United States Patent [19]

Stillhard

[11] Patent Number: 5,565,224

[45] Date of Patent: Oct. 15, 1996

[54] ELECTRIC INJECTION MOLDING MACHINE

[75] Inventor: Bruno J. Stillhard, St. Gallen, Switzerland

[73] Assignee: HPM Corporation, Mount Gilead, Ohio

[21] Appl. No.: 424,999

[22] Filed: Apr. 19, 1995

[30] Foreign Application Priority Data

Apr. 20, 1994 [CH] Switzerland ............ 01200/94-4

[51] Int. Cl.⁶ ............................................. B29C 45/66
[52] U.S. Cl. ........................... 425/589; 425/592; 425/593
[58] Field of Search ............................... 425/592, 593, 425/589, 450.1, 451.5, 451.6

[56] References Cited

U.S. PATENT DOCUMENTS

| | | | |
|---|---|---|---|
| 4,642,044 | 2/1987 | Ishikawa et al. | 425/593 |
| 4,938,682 | 7/1990 | Kadoriku et al. | 425/593 |
| 5,045,253 | 9/1991 | Kamiguchi et al. | 425/593 |
| 5,052,908 | 10/1991 | Inaba et al. | 425/592 |
| 5,370,524 | 12/1994 | Liang et al. | 425/593 |

FOREIGN PATENT DOCUMENTS

4345034A1  10/1994  Germany.

*Primary Examiner*—Tim Heitbrink
*Attorney, Agent, or Firm*—Baker & Daniels

[57] ABSTRACT

An injection molding machine where the movable mold platen 3 and the fixed mold platen 2a are arranged separately of the drive unit 20. The drive unit 20 is located behind the injection unit 1 and connected by pins 9 to the mold section. This arrangement offers the advantage of a cantilevered mold section, which enables maximum accessibility to the major working area.

20 Claims, 1 Drawing Sheet

PLAN VIEW A

ELECTRIC INJECTION MOLDING MACHINE

BACKGROUND OF THE INVENTION

The invention concerns an injection molding machine comprised of an injection unit, the mold parts and an electric drive for moving one mold part and clamping the guide pins.

The invention is based on an injection molding machine such as described in the German patent application No. P 43 45 034.2, to the entire content of which reference is made. In terms of manufacturing costs for the basic machine structure, this solution remains the most optimal solution to date. With various makes of hydraulic injection molding machines it is known to cantilever the entire mold section, which offers the particular advantage of keeping the major working area maximally open.

The problem underlying the invention now is to find a solution where this great advantage is being transferred also to an electrically powered injection molding machine.

SUMMARY OF THE INVENTION

The inventional solution is characterized in that the movable and fixed parts of the mold are arranged on one side of the injection unit, while the electric drive, joined by way of guide pins to the movable part of the mold, is arranged on the other side of the injection unit.

The new invention allows combining the two advantages of the electric machine and the machine with freely accessible molds, which not only facilitates mold change but also improves parts removal and enables especially high outputs.

A favorable embodiment is characterized in that the injection unit is located in an approximately centered machine bed between the fixed platen, as carrier of the fixed part of the mold, and the fixed knuckle platen, with the movable platen cantilevered on one side and a knuckle drive on the other and the two joined by way of guide pins.

According to a particularly preferred embodiment, the knuckle drive bears on the knuckle platen and the guide platen of the knuckle joint and connects preferably by way of a movable yoke with the guide pins. The electric drive features preferably a servomotor which is coupled in fixed fashion to a lead screw. Moreover, the drive is fashioned as a spindle-and-nut transmission, with the nut attached to the knuckle joint and the spindle rotatably to the fixed knuckle platen.

With particular preference, the transmission is fashioned as a roller-and-screw drive, in the context of which reference is made to the Swiss patent application No. 00 492/94-5 in its entirety.

According to another idea of embodiment, the mold level adjustment is arranged on the movable yoke. This leaves on the mold side only the drive for the ejector, which is arranged on the movable part of the mold.

BRIEF DESCRIPTION OF THE DRAWINGS

The invention will now be illustrated hereafter with the aid of several embodiments, showing in FIG. 1, an elevation of the injection molding machine according to the invention.

DESCRIPTION OF THE PREFERRED EMBODIMENT

Figures 1, 2:
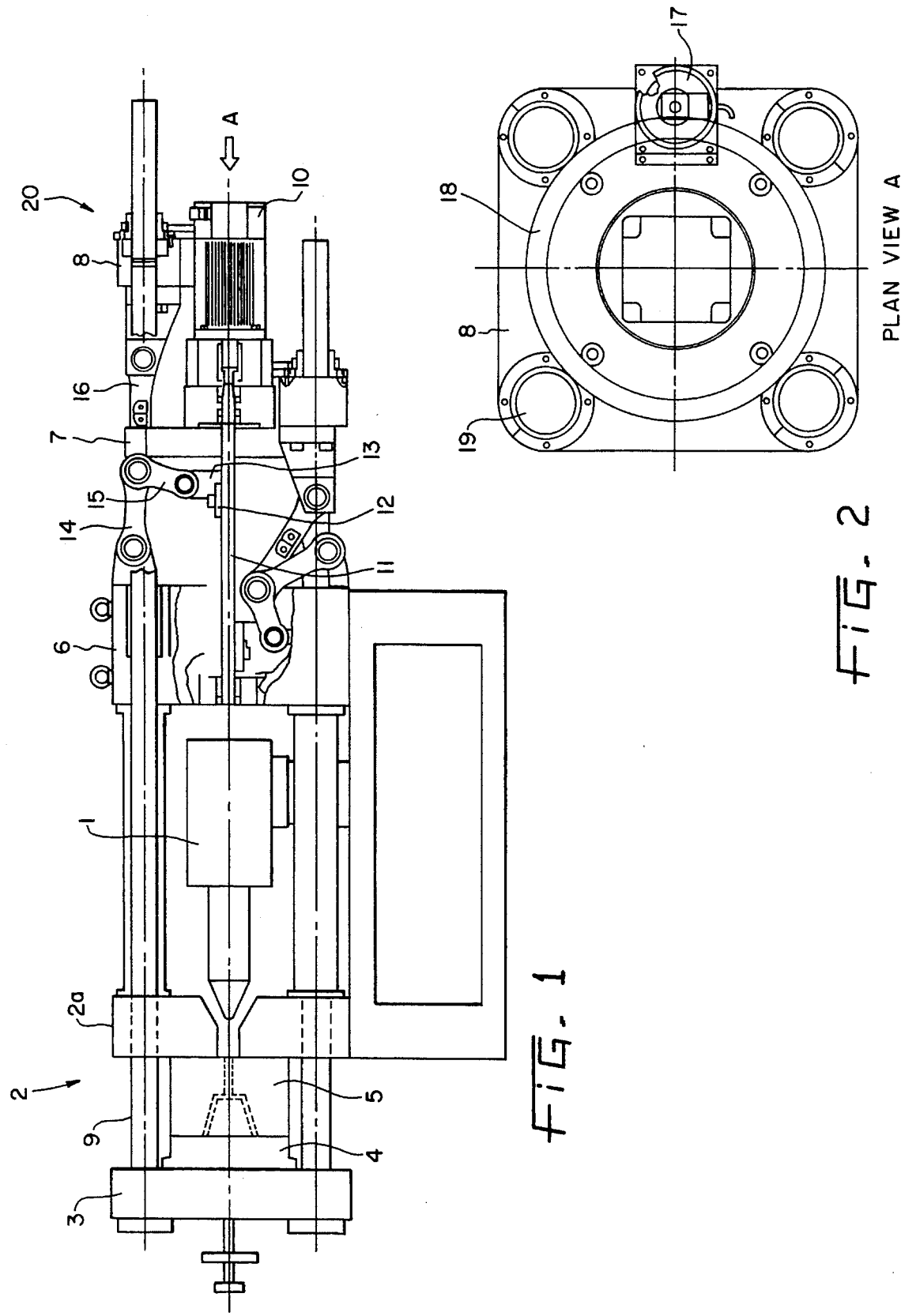
FIG. 2, a view of the yoke with the mold level adjustment.

Reference is made now to FIG. 1, which shows an injection molding machine. Contained on the one side of the injection unit 1 is the mold section 2 comprised of a fixed platen 2a, movable platen 3 with the movable part 4 and the fixed part 5 of the mold. Located on the other side of the injection unit is the drive unit 20 for the movable part of the mold. The drive unit 20 is comprised of the fixed knuckle platen 6, the movable yoke 8 and the actual drive elements, a servomotor 10 mounted on the guide platen 7 and driving the spindle 11. The spindle 11, in turn, drives the knuckle joint 13 by way of the nut 12. The knuckle joint actuates the knuckle system composed of parts 14, 15, 16, which move the yoke 8. The movable platen is moved by the yoke 8 by way of pins 9.

FIG. 2 shows a plan view A of the yoke 8, which supports the mold level adjustment. The mold level adjustment serves the adaptation to the various tool heights (movable part 4, fixed part 5 of mold) and includes the motor 17 for driving the gear rim 18, which latter drives the four pin nuts 19.

I claim:

1. An electric injection molding machine comprising:

an injection unit including a first side and a second side;

a mold including a movable mold part and a fixed mold part;

a plurality of pins;

an electric drive for moving said movable mold part and clamping the mold, said electric drive joined to said movable mold part by said plurality of pins; and wherein said movable mold part and said fixed mold part are arranged on said first side of said injection unit, and wherein said electric drive is arranged on said second side of said injection unit.

2. The electric injection molding machine of claim 1 further comprising:

an approximately centered machine bed;

a fixed mold platen;

a movable mold platen;

wherein said electric drive comprises a fixed knuckle platen and a knuckle drive;

wherein said injection unit is disposed in said machine bed between said fixed mold platen and said fixed knuckle platen; and wherein said movable mold platen is cantilevered on said first side and joined to said knuckle drive on said second side by said plurality of pins.

3. The electric injection molding machine of claim 1 wherein said electric drive further comprises:

a knuckle drive including a knuckle joint;

a fixed knuckle platen;

a guide platen for the knuckle joint;

a movable yoke;

wherein said knuckle drive bears on said knuckle platen and said guide platen; and wherein said knuckle drive is joined to said plurality of pins by said movable yoke.

4. The electric injection molding machine of claim 1 wherein said electric drive comprises a servomotor and a drive spindle coupled in fixed fashion to said servomotor.

5. The electric injection molding machine of claim 1 wherein said electric drive comprises a fixed knuckle platen, a knuckle joint and a spindle-and-nut transmission, wherein a nut of said transmission is joined to said knuckle joint, and wherein a spindle of said transmission is rotatably joined to said fixed knuckle platen.

6. The electric injection molding machine of claim 5 wherein said transmission comprises a roller-and-thread drive.

7. The electric injection molding machine of claim 1 wherein said electric drive comprises a movable yoke joined to said movable mold part by said plurality of pins, and a mold level adjustment means arranged on said movable yoke.

8. The electric injection molding machine of claim 2 wherein said electric drive comprises:

a guide platen for a knuckle joint of the knuckle drive;

a movable yoke;

wherein said knuckle drive bears on said knuckle platen and said guide platen; and wherein said knuckle drive is joined to said plurality of pins by said movable yoke.

9. The electric injection molding machine of claim 2 wherein said electric drive comprises a servomotor and a drive spindle coupled in fixed fashion to said servomotor.

10. The electric injection molding machine of claim 3 wherein said electric drive comprises a servomotor and a drive spindle coupled in fixed fashion to said servomotor.

11. The electric injection molding machine of claim 2 wherein said electric drive comprises a spindle-and-nut transmission and a knuckle joint, wherein a nut of said transmission is joined to said knuckle joint, and wherein a spindle of said transmission is rotatably joined to said fixed knuckle platen.

12. The electric injection molding machine of claim 3 wherein said electric drive comprises a spindle-and-nut transmission, wherein a nut of said transmission is joined to said knuckle joint, and wherein a spindle of said transmission is rotatably joined to said fixed knuckle platen.

13. The electric injection molding machine of claim 4 wherein said electric drive comprises a spindle-and-nut transmission, a fixed knuckle platen, and a knuckle joint, wherein a nut of said transmission is joined to said knuckle joint, and wherein a spindle of said transmission is rotatably joined to said fixed knuckle platen.

14. The electric injection molding machine of claim 2 wherein said electric drive comprises a movable yoke joined to said movable mold part by said plurality of pins, and a mold level adjustment means arranged on said movable yoke.

15. The electric injection molding machine of claim 3 wherein said electric drive comprises a movable yoke joined to said movable mold part by said plurality of pins, and a mold level adjustment means arranged on said movable yoke.

16. The electric injection molding machine of claim 4 wherein said electric drive comprises a movable yoke joined to said movable mold part by said plurality of pins, and a mold level adjustment means arranged on said movable yoke.

17. The electric injection molding machine of claim 5 wherein said electric drive comprises a movable yoke joined to said movable mold part by said plurality of pins, and a mold level adjustment means arranged on said movable yoke.

18. The electric injection molding machine of claim 6 wherein said electric drive comprises a movable yoke joined to said movable mold part by said plurality of pins, and a mold level adjustment means arranged on said movable yoke.

19. An electric injection molding machine comprising:

an injection unit including a first side and a second side;

a mold including a movable mold part and a fixed mold part;

at least one pin;

electric drive means for moving said movable mold part, said drive means including a knuckle drive operatively connected to said movable mold part by said at least one pin;

wherein said injection unit is positioned between said fixed mold part and said knuckle drive; and wherein said fixed mold part is located between said injection unit and said movable mold part.

20. The electric injection molding machine of claim 19 further comprising:

a fixed mold platen upon which said fixed mold part is mounted;

a movable mold platen upon which said movable mold part is mounted, said movable mold platen connected proximate a first end of said at least one pin;

wherein said electric drive comprises:

a fixed knuckle platen operatively attached to a first member of said knuckle drive;

a movable yoke operatively attached to a second member of said knuckle drive, said movable yoke connected proximate an opposite, second end of said at least one pin, whereby travel of said movable yoke results in travel of said movable mold platen and said movable mold part.

\* \* \* \* \*